United States Patent [19]
Shibata

[11] Patent Number: 5,933,247
[45] Date of Patent: Aug. 3, 1999

[54] IMAGE COMMUNICATION APPARATUS CAPABLE OF PARALLEL PROCESSING OF IMAGE STORAGE AND TRANSMISSION

[75] Inventor: Hiroshi Shibata, Isehara, Japan

[73] Assignee: Ricoh Co., Ltd., Tokyo, Japan

[21] Appl. No.: 08/888,296

[22] Filed: Jul. 3, 1997

Related U.S. Application Data

[63] Continuation of application No. 08/556,398, Nov. 9, 1995, abandoned.

[30] Foreign Application Priority Data

Nov. 30, 1994 [JP] Japan .................................... 6-319466

[51] Int. Cl.$^6$ ...................................................... H04N 1/00
[52] U.S. Cl. .......................... 358/404; 358/444; 370/21.1
[58] Field of Search .................................... 358/404, 405, 358/442, 444, 460, 465, 468; 711/150, 171, 172; 371/21.1, 21.5; 370/229, 230

[56] References Cited

U.S. PATENT DOCUMENTS

| | | | |
|---|---|---|---|
| 4,774,590 | 9/1988 | Haganuma et al. ..................... | 358/444 |
| 4,884,147 | 11/1989 | Arimoto et al. ........................ | 358/443 |
| 5,050,006 | 9/1991 | Ogawa ..................................... | 358/440 |
| 5,208,681 | 5/1993 | Yoshida ................................... | 358/444 |
| 5,225,997 | 7/1993 | Lederer et al. .......................... | 364/550 |
| 5,311,327 | 5/1994 | Fukushima et al. .................... | 358/444 |
| 5,349,647 | 9/1994 | Freeburg et al. ....................... | 395/115 |
| 5,363,206 | 11/1994 | Fukushima ............................. | 358/440 |
| 5,585,941 | 12/1996 | Maemura ................................ | 358/444 |

FOREIGN PATENT DOCUMENTS 8-43166   2/1996   Japan .
8-328981 12/1996   Japan .

*Primary Examiner*—Edward L. Coles
*Assistant Examiner*—Madeleine Au Nguyen
*Attorney, Agent, or Firm*—Oblon, Spivak, McClelland, Maier & Neustadt, P.C.

[57] ABSTRACT

An image communication apparatus capable of a parallel processing of image storage and transmission is provided with a memory device for storing a criterion value for a remaining storage capacity of an image storage device. A control device determines if the remaining storage capacity of the image storage device is larger than the criterion value, and the parallel storage and transmission processing is executed only when the remaining storage capacity is larger than the criterion value.

19 Claims, 11 Drawing Sheets

| READING MODE / RESOLUTION | CHARACTER MODE | PHOTOGRAPH MODE |
|---|---|---|
| 200 x 100dpi | x1(STANDARD) | x4 |
| 200 x 200dpi | x2 | x8 |
*FIG. 5*
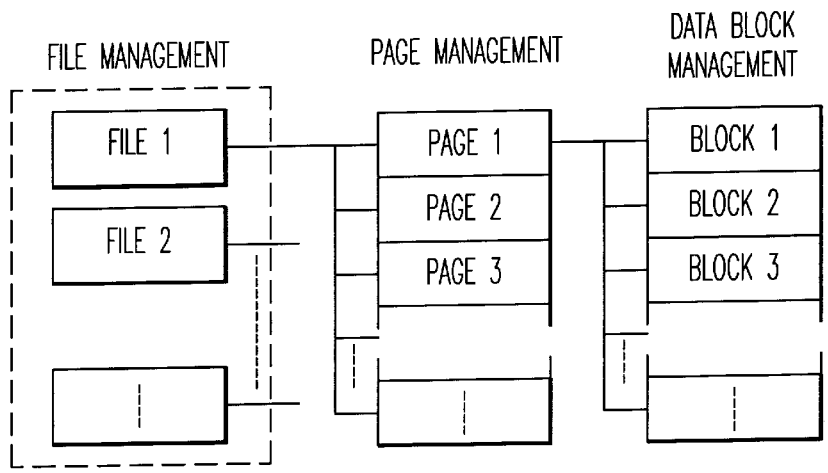
*FIG. 6*
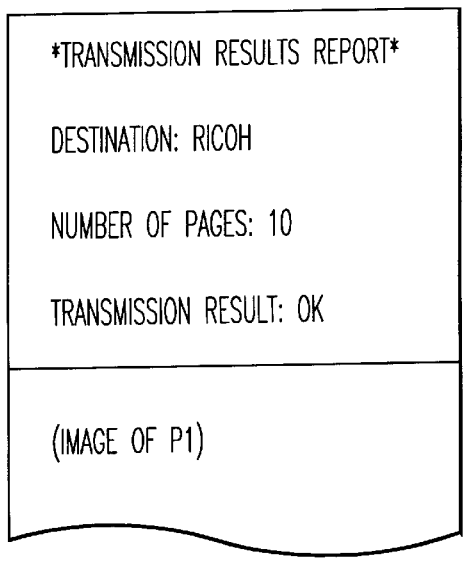
*FIG. 7*

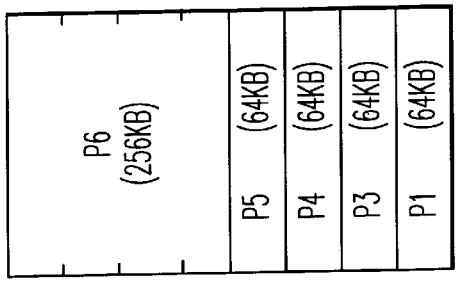
FIG. 13D
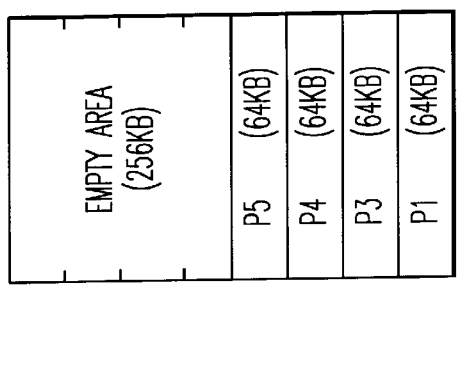
FIG. 13C
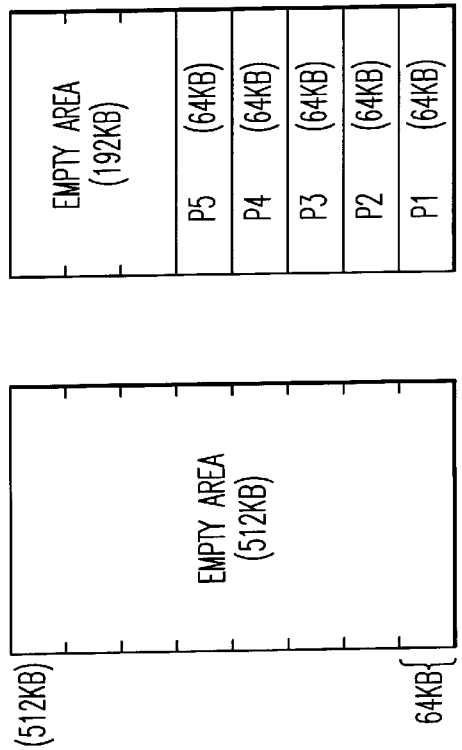
FIG. 13B
FIG. 13A
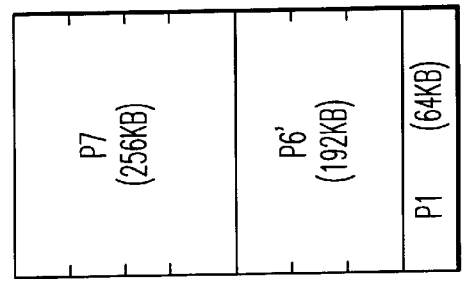
FIG. 13H
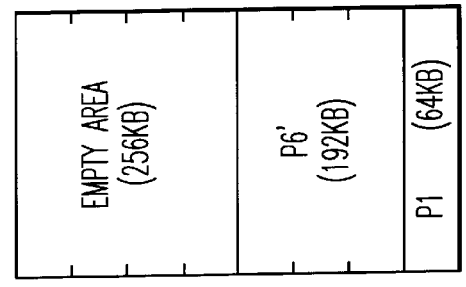
FIG. 13G
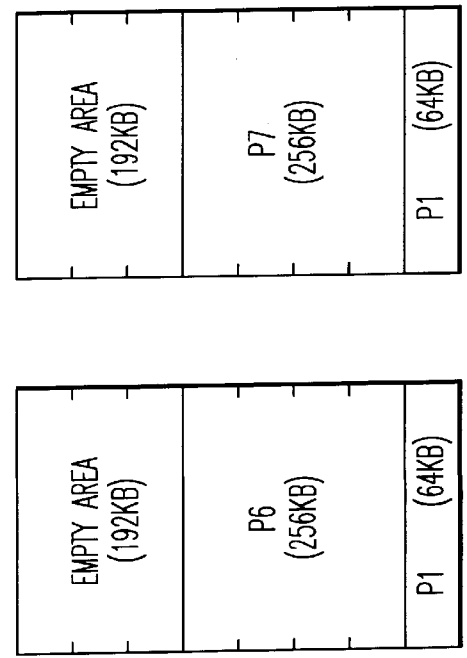
FIG. 13F
FIG. 13E

IMAGE COMMUNICATION APPARATUS CAPABLE OF PARALLEL PROCESSING OF IMAGE STORAGE AND TRANSMISSION This application is a continuation of application Ser. No. 08/556,398, filed on Nov. 9, 1995, now abandoned.

BACKGROUND OF THE INVENTION

1. Field of the Invention

The present invention relates to an image communication apparatus which is capable of executing an image storage process to store image data for transmission into an image storage device, after compression, in parallel with a transmission process to transmit such image data for transmission stored in the image storage device, and further to an image communication apparatus which is capable of, in addition to such a parallel storage and transmission processing function as mentioned above, recording and outputting, after completing transmission, a report showing the transmission results and having attached thereto an image of the first page of an image for transmission, and more particularly to the manner of executing such a parallel storage and transmission processing function.

2. Discussion of the Background

When transmitting an original document of plural pages to a designated destination using an image communication apparatus such as a facsimile machine, a user generally has to wait beside the apparatus until transmission of the last page of the original document is completed to bring back the original document from the apparatus to his or her desk.

For eliminating such an inconvenience, a facsimile machine has been put to practical use which is capable of performing a so-called store and forward function to store image data of an original document of plural pages once into an image storage device and then originate a call to transmit the stored image to a designated destination. By utilizing such a store and forward function, a user can take out an original document from the apparatus once the scanning and storing processes have been completed and leave from the apparatus leaving the following processing to the apparatus, thus shortening the period of time the user is fettered by the apparatus and greatly enhancing the convenience of the apparatus as a result. Since the process of storing an image data of an original document into an image storage device and the process of transmitting the stored image data are executed one by one in consecutive order as illustrated by steps S10–S14 in FIG. 1, the period of time for completing a whole process of transmitting an original document is the sum of a time for storing the image data into an image storage device and a time for transmitting such stored image data.

Here, the storage process includes a process of reading an original document by a reading device, such as a scanner, a process of compressing an image data which is obtained from such a reading process and a process of storing the compressed image data into an image storage device. The transmission process is primarily made of a process of reading out the image data which is stored in the image storage device and transmitting the data to a destination station. Since each process executed in the storage process and the transmission process is a kind of process which is not repeated as described above, it is conceivably possible to execute the storage process and the transmission process almost in parallel. If the storage process and the transmission process are executed in parallel as illustrated in FIG. 2 (such a process hereinafter is called a parallel storage and transmission processing), the period of time required for transmitting an original document can be shortened by the period of time the storage process and the transmission process are executed in parallel.

As described above, a parallel storage and transmission processing has an advantage of shortening a transmission time greatly, and is effective if such a parallel processing is executed when the remaining storage capacity of an image storage device is large enough to store the whole portion of an original document for transmission. However, if such a parallel processing is executed when the remaining storage capacity of an image storage device is not large enough, there is a possibility of the image storage device overflowing while storing an original document, thereby disabling further storage of the image data and causing such an inconvenience that transmission is terminated in the midst of the transmission. Since a reading speed of a scanner and a speed of storing an image data into a storage device are becoming faster lately, there is a good possibility that a storage area of the image storage device is used up and transmission is terminated frequently in the midst of transmitting an original document even if a measure is taken for deleting an image data which has been transmitted from the image storage device.

For eliminating such an inconvenience, it is conceivable, for example, to hold an image storage process temporarily before image storage device overflows, and at the same time to delete image data which has been transmitted from the image storage device for increasing the remaining empty storage capacity of the image storage device, and to restart the storage process once the empty storage capacity reaches a certain level. However, if such an intermittent reading and storing operation is made, a case occurs that a scanner stops while reading a page of an original document and makes a restart. If such a case occurs, there happens a situation that an image data of a portion of an original document where the scanner has stopped and made a restart is disordered causing, as a result, deterioration of the quality of an image for transmission.

SUMMARY OF THE INVENTION

The present invention has been made in view of the above-noted problems, and an object of the present invention is to provide an image communication apparatus which can perform a parallel processing of image storage and transmission in an adequate manner.

In order to achieve the above-mentioned objects, an image communication apparatus of the present invention has as one structure a parallel storage and transmission processing function to execute an image storage process to store image data for transmission into an image storage device, after compression, in parallel with an image transmission process to transmit the image data for transmission stored in the image storage device. The image communication apparatus includes a memory device for storing a criterion value for a remaining storage capacity of the image storage device and a controller for determining if the remaining storage capacity of the image storage device is larger than the criterion value stored in the memory device prior to executing the above-mentioned parallel storage and transmission processing function. Image data communication is executed with the parallel storage and transmission processing function when the remaining storage capacity of the image storage device is determined as larger than the criterion value stored in the memory device and with another mode of transmission when the remaining storage capacity is determined as smaller than the criterion value stored in the memory device.

Further, the controller as mentioned above, according to one operation of the present invention, when the remaining storage capacity of the image storage device becomes nil immediately after image data communication with the parallel storage and transmission processing function has been commenced, stores information on a destination which has been designated at that time as the last destination in the midst of transmission to which the image storage device has overflowed, while executing image data communication with another mode of transmission when a designated destination accords with such a last destination which is stored.

Further, the controller as mentioned above, according to one operation of the present invention, detects an overflow of the image storage device while image data communication with the parallel storage and transmission processing function is being executed, counts the number of times of detecting an overflow of the image storage device and changes the above-mentioned criterion value for the remaining storage capacity of the image storage device when the counted number exceeds a prescribed value.

Further, the controller as mentioned above, according to one operation of the present invention, detects an overflow of the image storage device while image data communication with the parallel storage and transmission processing function is being executed, determines a frequency of detecting an overflow of the image storage device and changes the above-mentioned criterion value for the remaining storage capacity of the image storage device when the frequency exceeds a prescribed value.

Further, in order to achieve the above-mentioned objects, an image communication apparatus has as one structure a parallel storage and transmission processing function to execute an image storage process to store image data for transmission into an image storage device, after compression, in parallel with an image transmission process to transmit the image data for transmission stored in the image storage device and a function to record and print out, when transmission is completed, a report showing the transmission results and attaching thereto an image of the first page of an image for transmission. The image communication apparatus includes a memory device for storing a criterion value for the remaining storage capacity of the image storage device and a controller for determining if the remaining storage capacity of the image storage device is larger than the criterion value stored in the memory device prior to executing the above-mentioned parallel storage and transmission processing function. Image data communication is executed with the parallel storage and transmission processing function when the remaining storage capacity of the image storage device is determined as larger than the criterion value stored in the memory device and with another mode of transmission when the remaining storage capacity is determined as smaller than the criterion value stored in the memory device. And, when transmission of image data for a page is completed while image data communication with the parallel storage and transmission processing function is being executed, image data which has been transmitted from the image storage device is deleted if the image data is not the first page of an image for transmission.

Further, in order to achieve the above-mentioned objects, an image communication apparatus has as one operation a parallel storage and transmission processing function to execute an image storage process to store image data for transmission into an image storage device, after compression, in parallel with an image transmission process to transmit the image data for transmission stored in the image storage device and a function to record and print out, when transmission is completed, a report showing the transmission results and attaching thereto an image of the first page of an image for transmission. The image communication apparatus includes a memory device for storing a criterion value for the remaining storage capacity of the image storage device and a controller for determining if the remaining storage capacity of the image storage device is larger than the criterion value stored in the memory device prior to executing the above-mentioned parallel storage and transmission processing function. Image data communication is executed with the parallel storage and transmission processing function when the remaining storage capacity is determined as larger than the criterion value stored in the memory device and with another mode of transmission when the remaining storage capacity is determined as smaller than the criterion value stored in the memory device. And, when transmission of a block of image data in an error correction mode is completed while image data communication with the parallel storage and transmission processing function is being executed, a block of image data which has been transmitted from the image storage device is deleted if the block is not the first page of an image for transmission.

Further, in order to achieve the above-mentioned objects, an image communication apparatus has as one operation a parallel storage and transmission processing function to execute an image storage process to store an image data for transmission into an image storage device, after compression, in parallel with an image transmission process to transmit the image data for transmission stored in the image storage device. The image communication apparatus includes a memory device for storing first and second criterion values for the remaining storage capacity of the image storage device and a controller for determining if the remaining storage capacity of the image storage device is larger than the first criterion value stored in the memory device prior to executing the above-mentioned parallel storage and transmission processing function. Image data communication is executed with the parallel storage and transmission processing function when the remaining storage capacity is determined as larger than the first criterion value stored in the memory device and with another mode of transmission when the remaining storage capacity is determined as smaller than the first criterion value stored in the memory device. And, when transmission of image data for a page is completed while image data communication with the parallel storage and transmission processing function is being executed, image data of the following pages is stored only when the remaining storage capacity of the image storage device is larger than the second criterion value stored in the memory device.

Further, a controller, according to one operation of the present invention, deletes image data of a page which has been transmitted from the image storage device when transmission of image data for a page is completed while image data communication with the parallel storage and transmission processing function is being executed.

Further, the controller, according to one operation of the present invention, detects an overflow of an image storage device while image data communication with the parallel storage and transmission processing function is being executed, counts the number of times of detecting an overflow of the image storage device and changes the first criterion value when the counted number exceeds a prescribed value.

Further, in order to achieve the above-mentioned objects, an image communication apparatus has as one operation a parallel storage and transmission processing function to execute an image storage process to store image data for transmission into an image storage device, after compression, in parallel with an image transmission process to transmit the image data for transmission stored in the image storage device and a function to record and print out, when transmission is completed, a report showing the transmission results and attaching thereto an image of the first page of an image for transmission. The image communication apparatus includes a memory device for storing first and second criterion values for the remaining storage capacity of the image storage device and a controller for determining if the remaining storage capacity of the image storage device is larger than the first criterion value stored in the memory device prior to executing the above-mentioned parallel storage and transmission processing function. Image data communication is executed with the parallel storage and transmission processing function when the remaining storage capacity is determined as larger than the first criterion value stored in the memory device and with another mode of transmission when the remaining storage capacity is determined as smaller than the first criterion value stored in the memory device. And, when transmission of image data for a page is completed while image data communication with the parallel storage and transmission processing function is being executed, image data for a page which has been transmitted from the image storage device is deleted if the image data is not the first page of image for transmission, and image data of the following pages is stored only when the remaining storage capacity of the image storage device is larger than the second criterion value stored in the memory device.

Further, in order to achieve the above-mentioned objects, an image communication apparatus has as one operation a parallel storage and transmission processing function to execute an image storage process to store image data for transmission into an image storage device, after compression, in parallel with an image transmission process to transmit the image data for transmission stored in the image storage device and a function to record and print out, when transmission is completed, a report showing the transmission results and attaching thereto an image of the first page of an image for transmission. The image communication apparatus includes a memory device for storing first and second criterion values for the remaining storage capacity of the image storage device and a controller for determining if the remaining storage capacity of the image storage device is larger than the first criterion value stored in the memory device prior to executing the above-mentioned parallel storage and transmission processing function. Image data communication is executed with the parallel storage and transmission processing function when the remaining storage capacity of the image storage device is determined as larger than the first criterion value stored in the memory device and with another mode of transmission when the remaining storage capacity is determined as smaller than the first criterion value stored in the memory device. And, when transmission of a block of image data in an error correction mode is completed while image data communication with the parallel storage and transmission processing function is being executed, a block of image data which has been transmitted from the image storage device is deleted if the block is not the first page of an image for transmission, and further, when transmission of image data for a page is completed, image data for a page which has been transmitted is deleted from the image storage device and image data of the following pages is stored only when the remaining storage capacity of the image storage device is larger than the second criterion value stored in the memory device.

As described above, with the image communication apparatus in accordance with the present invention, a parallel storage and transmission processing function is not executed when the remaining storage capacity of an image storage device is not large enough. Therefore, there does not occur such an inconvenient situation that an image storage device overflows to disable further storage of an image data while storing image data of an original document for transmission, and a parallel processing of image storage and transmission is executed in an adequate manner accordingly.

Also, when an overflow of an image storage device happens frequently while a parallel storage and transmission processing function is being executed, a criterion value for the remaining storage capacity of the image storage device is updated accordingly, and therefore, a parallel processing of image storage and transmission is executed in an adequate manner with the image communication apparatus in accordance with the present invention.

Also, when transmission is instructed to a destination which accords with the last destination, transmission to which has been discontinued due to an overflow of an image storage device immediately after a parallel storage and transmission processing has been commenced, a parallel storage and transmission processing function is not executed and image data communication with another mode of transmission is executed instead accordingly. Therefore, an efficient image data communication is possible with the image communication apparatus in accordance with the present invention.

Also, since image data of an image of the first page of an original document for transmission which is to be attached to a report showing the transmission results is kept in an image storage device, an adequate report showing the transmission results can be recorded and outputted with the image communication apparatus in accordance with the present invention.

Also, since a block of image data in an error correction mode which has been transmitted is deleted every time the transmission is completed, a storage process for following pages is executed smoothly and a transmission time is shortened with the image communication apparatus in accordance with the present invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a diagram showing an example of a coefficient table;

FIG. 6 is a diagram showing an example of a file management system of an image storage unit;

FIG. 7 is a diagram illustrating an example of a report showing transmission results;

FIG. 13 is a diagram illustrating an example of a change in the content of a storage area of an image storage unit.

DESCRIPTION OF THE PREFERRED EMBODIMENTS

Figure 1:
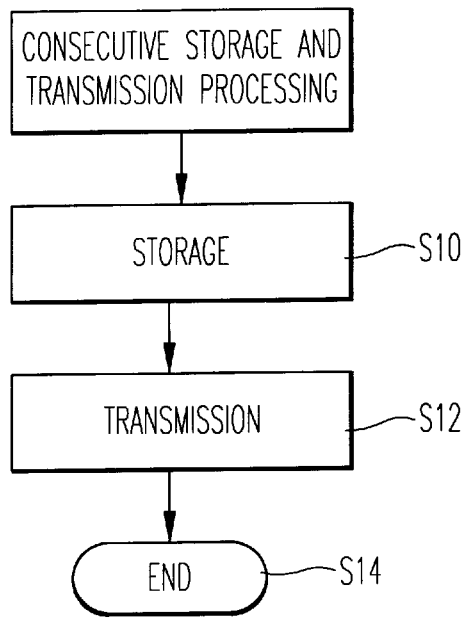
FIG. 1 is a flowchart explaining an outline of a consecutive storage and transmission processing.
Figure 2:
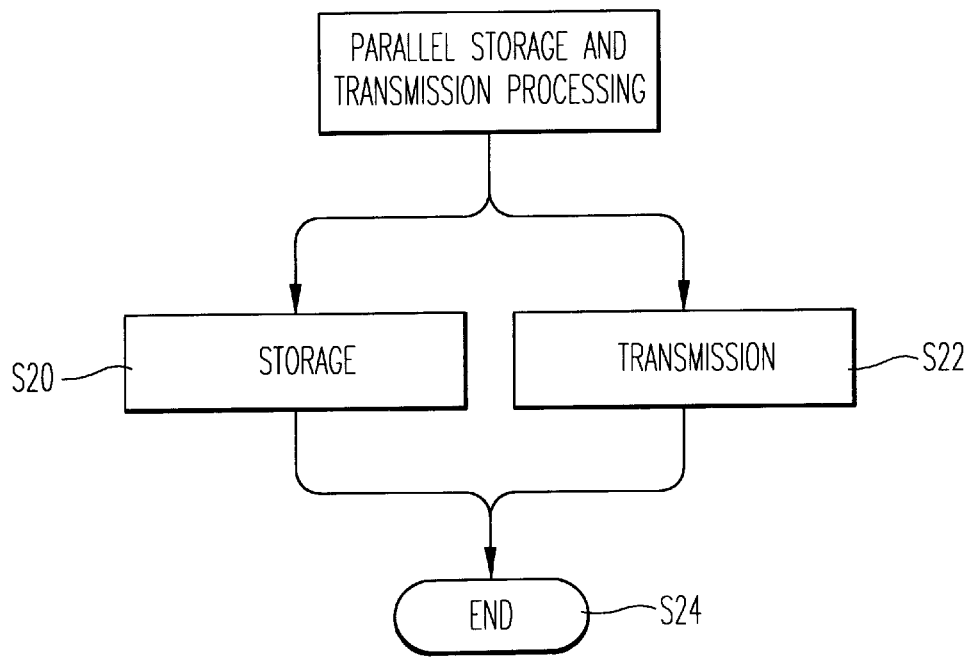
FIG. 2 is a flowchart explaining an outline of a parallel storage and transmission processing.

Referring now to the drawings, wherein like reference numerals designate identical or corresponding parts throughout the several views, embodiments of the present invention are explained.

Figure 3:
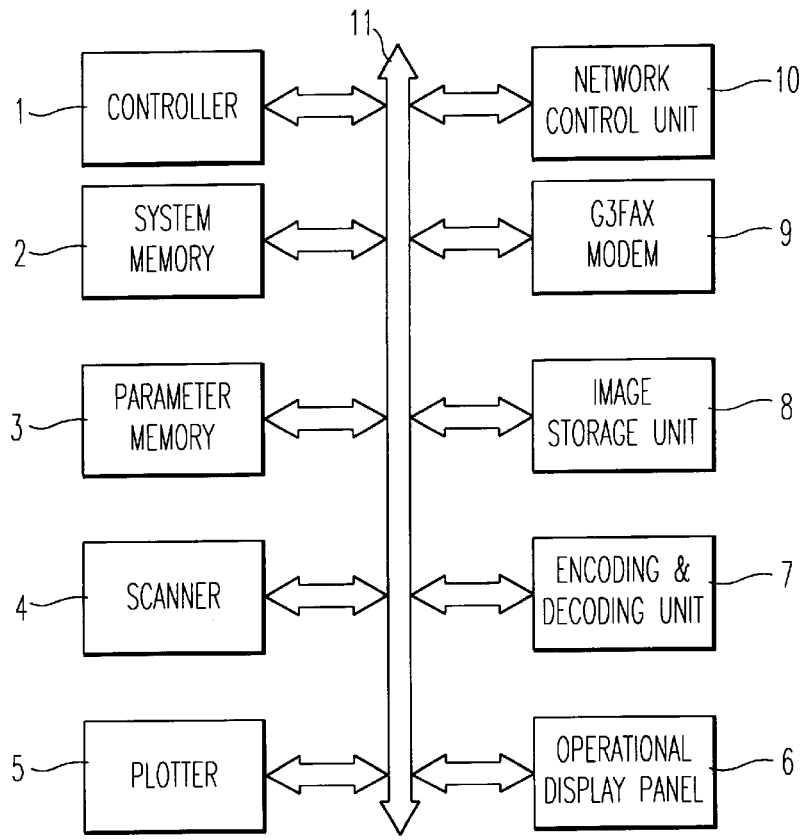
FIG. 3 is a block diagram illustrating a G3 facsimile equipment according to the present invention.

FIG. 3 is a block diagram illustrating a G3 facsimile equipment according to the present invention. In FIG. 3, a controller 1 controls various parts of the G3 facsimile equipment and processes a facsimile transmission protocol, a system memory 2 stores control programs the controller 1 executes and various data required for executing the control programs and provides a work area for the controller 1, and a parameter memory 3 stores various information peculiar to this G3 facsimile equipment. A scanner 4 reads an original document with plural resolutions, such as 200×100 dpi and 200×200 dpi, and with a character mode or a photograph mode. Here, a character mode is a mode for reading binary images with which character images are read in an adequate manner, and a photograph mode is a mode for reading pseudo halftone images with which photograph images are read adequately. A plotter 5 records and outputs an image with a prescribed resolution such as 200×200 dpi, and an operational display panel 6 provides an operational panel for operating this facsimile equipment and includes various operational keys and display devices.

An encoding and decoding unit 7 compresses and decompresses an image signal and an image storage unit 8 stores a large number of image data which has been compressed. A G3 facsimile modem 9 performs a G3 facsimile modem function and includes a slow speed modem (V.21 modem) for exchanging a transmission protocol and a high speed modem (V.17 modem, V.33 modem, V29 modem, V27ter modem and so forth) for transmitting primarily image data. A network control unit 10 connects the facsimile equipment to a public network and is equipped with an automatic call originating and receiving function. The controller 1, the system memory 2, the parameter memory 3, the scanner 4, the plotter 5, the operational display panel 6, the encoding and decoding unit 7, the image storage unit 8, the G3 facsimile modem 9 and the network control unit 10 are connected to an internal bus 11 and data are exchanged among these elements through this internal bus 11. Data exchange between the network control unit 10 and the G3 facsimile modem 9 is made directly.

Further, this G3 facsimile equipment is equipped with a parallel storage and transmission processing function of executing, when transmitting image data, an image storage process to read an original document for transmission which is placed on the scanner 4, compress the resulting image signal by the encoding and decoding unit 7 and store the resulting image data into the image storage unit 8 in parallel with an image transmission process to originate a call to a designated destination, set conditions for transmitting image data by executing a prescribed transmission protocol with the destination equipment, and transmit image data stored in the image storage unit 8 to the destination equipment.

Further, in a case that an encoding method applied to image data stored in the image storage unit 8 by the image storage process does not accord with an encoding method a destination equipment can receive, the image data stored in the image storage unit 8 is decoded to the original image signal by the encoding and decoding unit 7, and then encoded with an encoding method the destination equipment can receive, and the resulted image data is then transmitted to the destination equipment. For accomplishing the above-mentioned processing, a system may be so made that the encoding and decoding unit 7 is operated independently, and further, the encoding and decoding unit 7 may be such that an encoding process and a decoding process are operated independently.

Further, when a resolution of an image signal resulting from the reading by the scanner 4 does not accord with a resolution a destination equipment can receive, an image data stored in the image storage unit 8 is decoded by the encoding and decoding unit 7 to the original image signal, and the resolution of the original image signal is converted to a resolution the destination equipment can receive with a resolution conversion process by the controller 1. Then, the image signal after such conversion is encoded with a method the destination equipment can receive and the resulted image data is transmitted to the destination equipment.

Also, in the system memory 2 data buffering areas are formed and maintained as required for various data bufferings such as a FIFO buffering for storing temporarily an image data for transmission, a line buffering for storing temporarily an image signal resulted from the scanner 4 in a unit of a line, an ECM buffering, and so on.

Figure 4A:
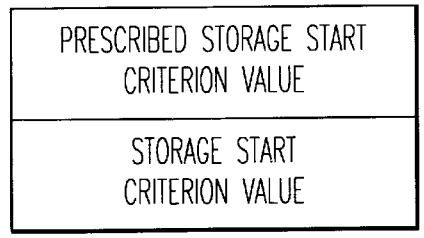
FIG. 4(a) is a diagram illustrating an example of a prescribed storage start criterion value and a storage start criterion value.

In the parameter memory 3 are stored a prescribed storage start criterion value and a storage start criterion value, as illustrated in FIG. 4(a), which are conditions for starting the above-mentioned parallel storage and transmission processing function. The prescribed storage start criterion value is a value which is prescribed and stored through a prescribed manipulation of the operational display panel 6 by a user and the storage start criterion value is a value which is actually used as a condition for starting a parallel storage and transmission processing function. When a user manipulates and prescribes a value of a prescribed storage start criterion value, such a prescribed storage start criterion value is copied and used as a storage start criterion value. Here, a prescribed storage start criterion value is set to one of 256 KB, 512 KB and 768 KB, for example, through a prescribing operation by a user (in this case, an operation of selecting one of 256 KB, 512 KB and 768 KB). Further, a value of 512 KB may be prescribed, for example, as an initial (default) value which is to be applied when there is no prescribing operation by a user.

Also, when a storage error is repeated more than a prescribed number of times, a storage start criterion value is updated to such a value with which a parallel storage and transmission processing function is executed as much as practical, by adding a certain value consecutively as described later. However, when a user prescribes again a prescribed storage start criterion value or initializes a storage start criterion value, the value of a storage start criterion is returned to that of the prescribed storage start criterion value.

Figure 4B:
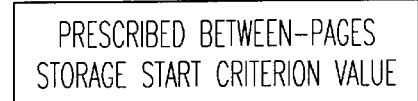
FIG. 4(b) is a diagram illustrating an example of a prescribed between-pages storage start criterion value.

Further, in the system memory 2 is stored a prescribed between-pages storage start criterion value, as shown in FIG. 4(*b*), which is used as a criterion for calculating a between-pages storage start criterion value which is a condition for starting reading of a next page when image data communication with the parallel storage and transmission processing function is being executed, and in a case that an original document for transmission is of plural pages. This prescribed between-pages storage start criterion value may be stored in the parameter memory 3 instead of the system memory 2.

Also, in the system memory 2 is stored a coefficient table as shown in FIG. 5 for calculating, in accordance with the above-mentioned prescribed between-pages storage start criterion value, a between-pages storage start criterion value which is a condition for starting reading of a next page when image data communication with the parallel storage and transmission processing function is being executed, and in a case that an original document for transmission is of plural pages.

Further, image data stored in the image storage unit 8 is managed in a unit of a file, and each file is managed in a unit of a page, and further, an image data of each page is managed in a unit of a 2 KB data block, as illustrated in FIG. 6.

Moreover, when image data transmission is completed, a report showing the results of the transmission as illustrated in FIG. 7 is produced, and is then recorded and outputted by the plotter 5 in this embodiment. And, a portion of an image of the first page of an original document for transmission is attached to the report so that a user can identify the corresponding transmission file.

A G3 facsimile equipment as illustrated in FIG. 3, being constructed as described above, initially applies a parallel storage and transmission processing function when a transmission instruction is made. And then, when such a parallel storage and transmission processing function can not be applied, a consecutive storage and transmission processing function to execute an image storage process and an image transmission process in consecutive order is applied. Further, when such a consecutive storage and transmission processing function can not be applied, a direct transmission processing function is applied.

Here, the consecutive storage and transmission processing function is a transmission processing function to originate a call to a designated destination and transmit image data stored in the image storage unit 8 to the designated destination equipment after reading an original document for transmission placed on the scanner 4, compressing the resulted image signal by the encoding and decoding unit 7 and storing the resulted compressed image data into the image storage unit 8. The direct transmission processing function is a transmission processing function to read an original document for transmission placed on the scanner 4, compress the resulting image signal with an encoding method the designated destination equipment can receive by the encoding and decoding unit 7, and then transmit the resulting compressed image data to the designated destination equipment.

Figure 8:
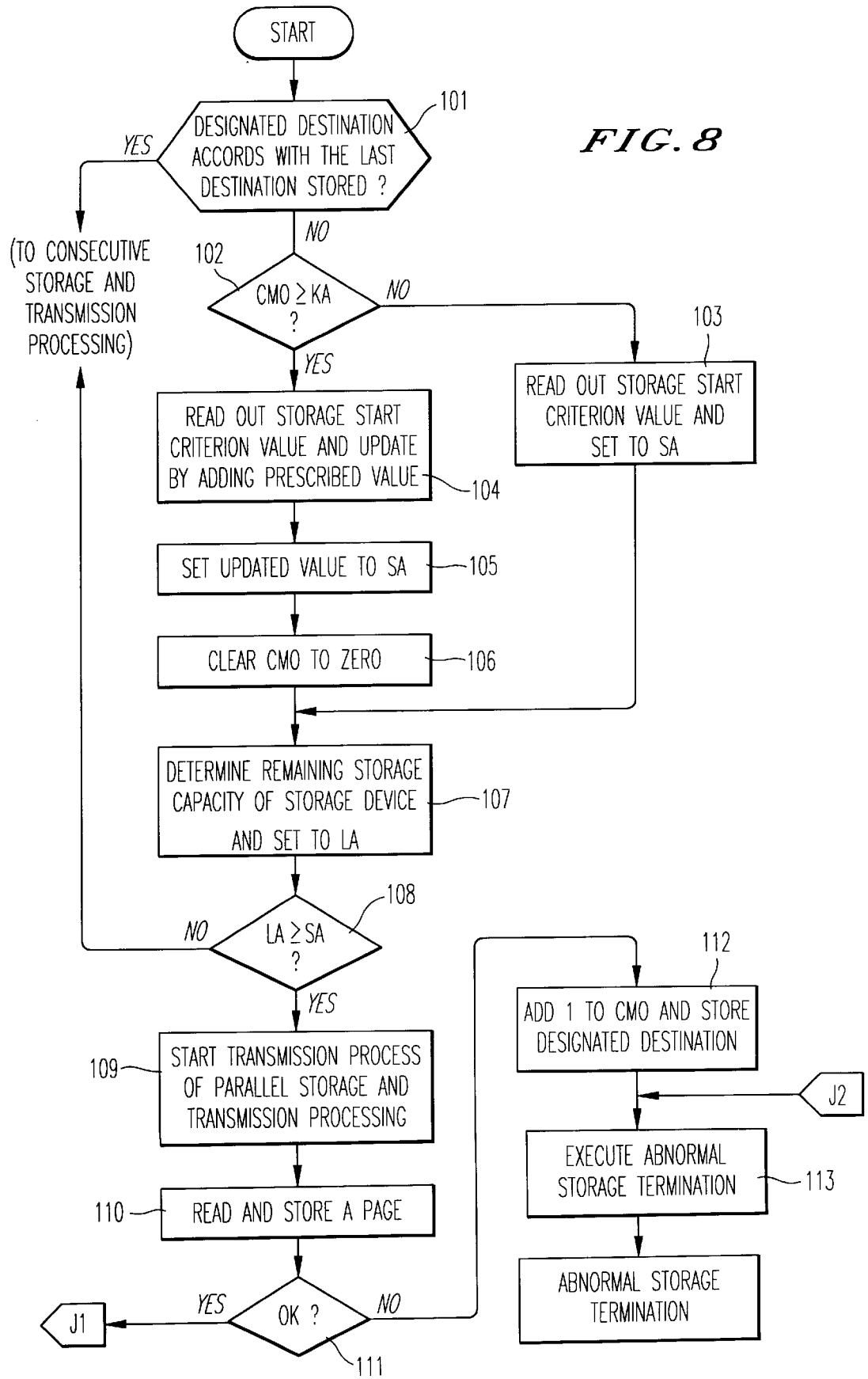
FIG. 8 and FIG. 9 are flowcharts illustrating an example of a storage process of a parallel storage and transmission processing function.
Figure 9:
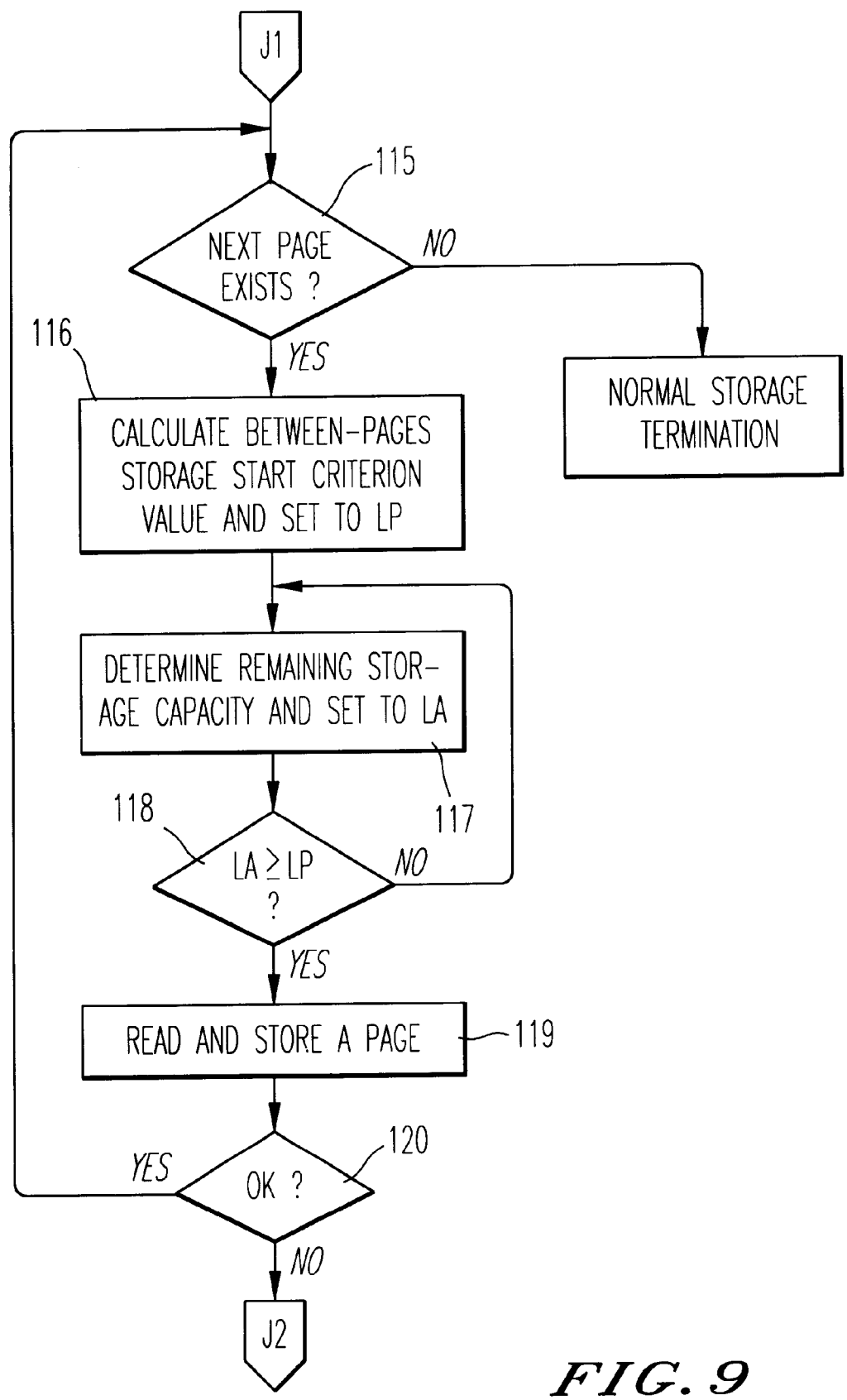

When a user depresses a start key placing an original document of plural pages for transmission on the scanner 4 and designates a destination by manipulating the operational display panel 6, the controller 1 starts a storage process as illustrated in FIG. 8 and FIG. 9.

First, step 101 checks if the designated destination accords with the one which is designated in an immediately preceding transmission operation and which was stored due to a storage error, and if the result of step 101 is NO, step 102 checks if a value of a counter CMO, which stores the number of times of storage errors, exceeds a prescribed criterion value KA. If the result of step 102 is NO, step 103 reads out a storage start criterion value from the parameter memory 3 and sets it to a variable SA. If the result of step 102 is YES, a parallel storage and transmission processing function can not be executed with a prescribed storage start criterion value which is prescribed by a user, and therefore, step 104 updates the storage start criterion value which is stored in the parameter memory 3 by adding a prescribed value (for example 2 KB, 4 KB, 8 KB, 16 KB, 32 KB, 64 KB or 128 KB) to the storage start criterion value which is read out from the parameter memory 3, and step 105 sets such an updated value to the variable SA and step 106 clears the value of the counter CMO to zero at this time.

When a storage start criterion value is set to the variable SA as described above, step 107 determines the remaining storage capacity of the image storage unit 8 and sets a value of such remaining storage capacity to a variable LA, and then step 108 checks if the value of the variable LA is larger than that of the variable SA.

When the result of step 108 is NO, it is a state where the remaining storage capacity of the image storage unit 8 is not large enough and there exists a possibility that the image storage unit 8 may overflow during transmission, thereby discontinuing the storage operation in the middle of a page. In such a case, the above-mentioned consecutive storage and transmission processing is executed since a parallel storage and transmission processing can not be executed in an adequate manner. If the designated destination accords with a destination which is designated in an immediately preceding transmission operation and which was stored due to a storage error as described above, and the result of step 101 is YES, it is a case that the image storage unit 8 will overflow while storing the first page despite conditions for starting a parallel storage and transmission processing have been met. In such a case, a parallel storage and transmission processing can not be executed, and a consecutive storage and transmission processing is executed instead.

When the result of step 108 is YES, step 109 commences a transmission process of a parallel storage and transmission processing for executing an image data transmission process, and step 110 executes a page reading and storage process to read the first page of an original document for transmission by the scanner 4, compress the resulted image signal by the encoding and decoding unit 7 and store the resulted compressed image data into the image storage unit 8. Then step 111 checks whether or not image data for one page of an image for transmission has been stored in an adequate manner in the image storage unit 8 by such a page reading and storage process.

In case the result of step 111 is NO, step 112 adds 1 to a value of the counter CMO and at the same time stores a destination designated at that time as a destination to which a storage error occurred during transmission, and step 113 terminates the image storage by executing an abnormal storage termination process which is a prescribed processing for a case that a storage operation of an image data is terminated abnormally. This abnormal storage termination process includes such processes to display a guidance message for notifying a user who is waiting beside the apparatus of completion of an abnormal termination, sound an error beep, interrupt reading of an original document by the scanner 4 and exit an original document from the scanner 4 whose reading has been discontinued during reading.

When the result of step 111 is YES, step 115, see FIG. 9, checks if the next page of an original document for transmission is placed on the scanner 4, and if the result of step 115 is NO, it is a case that all the pages of an original document have been read and a storage process terminates normally. When the result of step 115 is YES, step 116 reads out from a coefficient table a coefficient which is applicable to a resolution and a reading mode which are designated at that time, calculates a between-pages storage start criterion value by multiplying a value of such a coefficient to a value of a prescribed between-pages storage start criterion value, and sets such between-pages storage start criterion value to the variable LP.

Then, step 117 determines the remaining storage capacity of the image storage unit 8 and sets the resultant value to the variable LA. Step 118 then checks if the value of the variable LA is larger than the value of the variable LP, and if the result of step 118 is NO, an image data which has been transmitted is deleted from the image storing unit 8, and step 117 and step 118 are repeated until the capacity of the empty storage area of the image storage unit 8 is secured and the value of the variable LA becomes larger than the value of the variable LP.

When the result of step 118 is YES, step 119 executes a page reading and storage process to read the next page of an original document for transmission by the scanner 4, compress the resultant image signal by the encoding and decoding unit 7 and store the resultant compressed image data in the image storage unit 8. Then, step 120 checks if image data for one page is stored adequately in the image storage unit 8 by such a page reading and storage process.

If the result of step 120 is YES, the process returns to step 115 which checks if there is a next page. If the result of step 120 is NO, step 113 executes an abnormal storage termination process, thereby terminating a transmission operation of a parallel storage and transmission processing.

Figure 10:
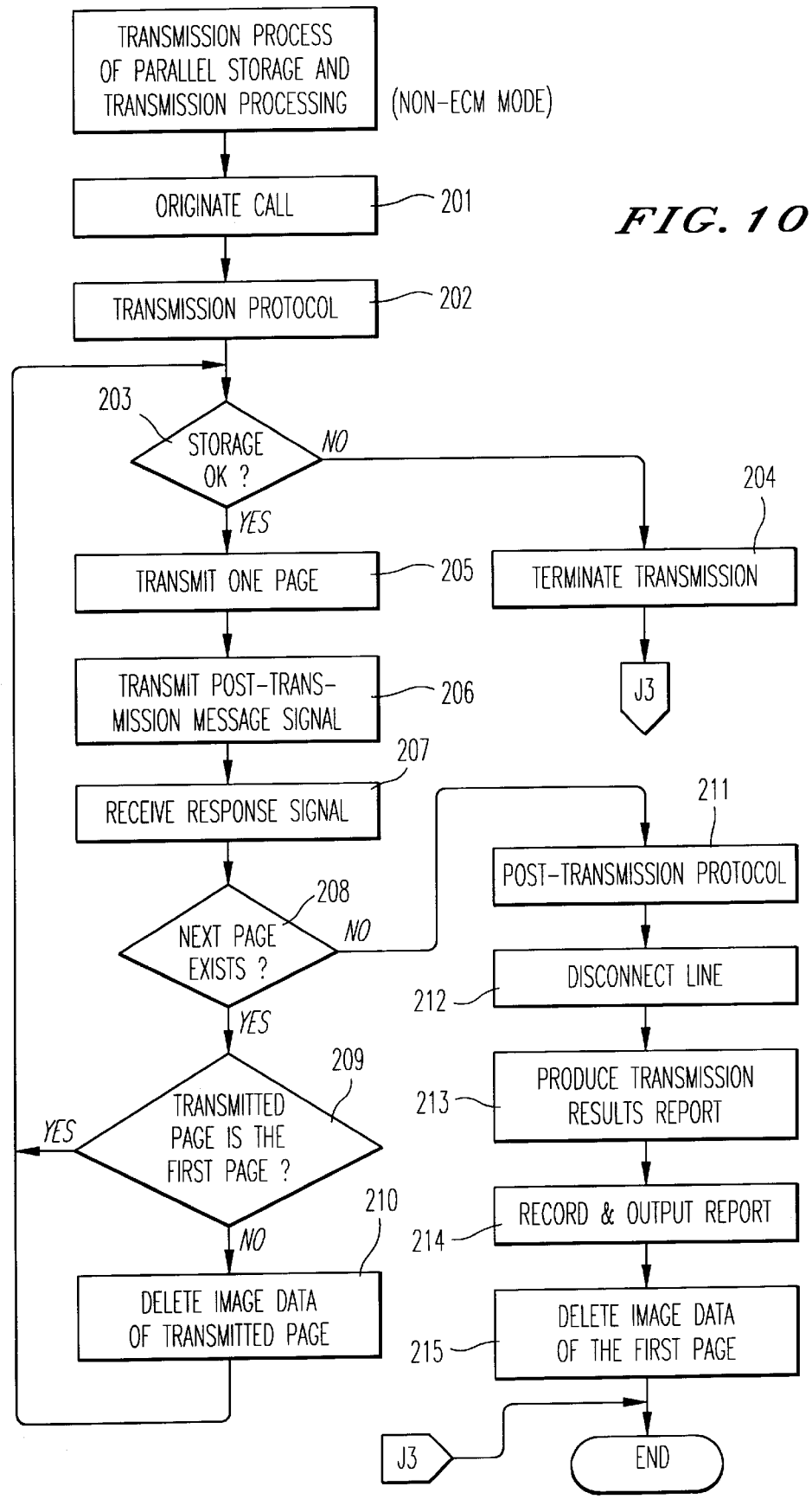
FIG. 10 is a flowchart illustrating an example of a transmission process of a parallel storage and transmission processing function in a non-ECM mode.

FIG. 10 is a flowchart illustrating an example of a transmission process of a parallel storage and transmission processing function. In this example, a non-ECM mode is prescribed as a transmission mode.

First, step 201 originates a call to a designated destination and step 202 executes a prescribed transmission protocol to be made prior to transmission with the destination equipment, preparing for an image data transmission. Then, step 203 checks if a storage process is performing a storage operation normally, and if the result of step 203 is NO, step 204 discontinues the transmission operation at that timing, terminating the transmission process as an error.

When the result of step 203 is YES, step 205 selects and transmits an image data for one page stored in the image storage unit 8 in order of pages, step 206 transmits a prescribed post message signal and step 207 receives a response signal from the destination equipment.

Step 208 then checks if image data of the following pages are stored in the image storage unit 8, and if the result of step 208 is YES, step 209 checks if the image data which has been transmitted is the first page. If the result of step 209 is YES, the operation returns to step 203 to perform transmission of image data of the next page, leaving the image data of the first page as stored in the image storage unit 8 since the image of the first page needs to be attached to a report on the transmission results. If the result of step 209 is NO, step 210 deletes an image data of a page which has been transmitted, and the operation returns to step 203 to transmit image data of the next page.

When transmission of all the pages of a stored image data have been completed and the result of step 208 is NO, step 211 executes a prescribed post-transmission protocol and step 212 disconnects a line, terminating a series of transmission operations.

Then, step 213 produces an image of a report on the transmission results in accordance with the result of the transmission and attaches thereto an image of the first page as illustrated in FIG. 7, and step 214 records and outputs the report by the plotter 5. Since the image of the first page has been made use of by this process, step 215 deletes the image data of the first page from the image storage unit 8 and terminates this transmission process of the parallel storage and transmission processing function.

Figure 11:
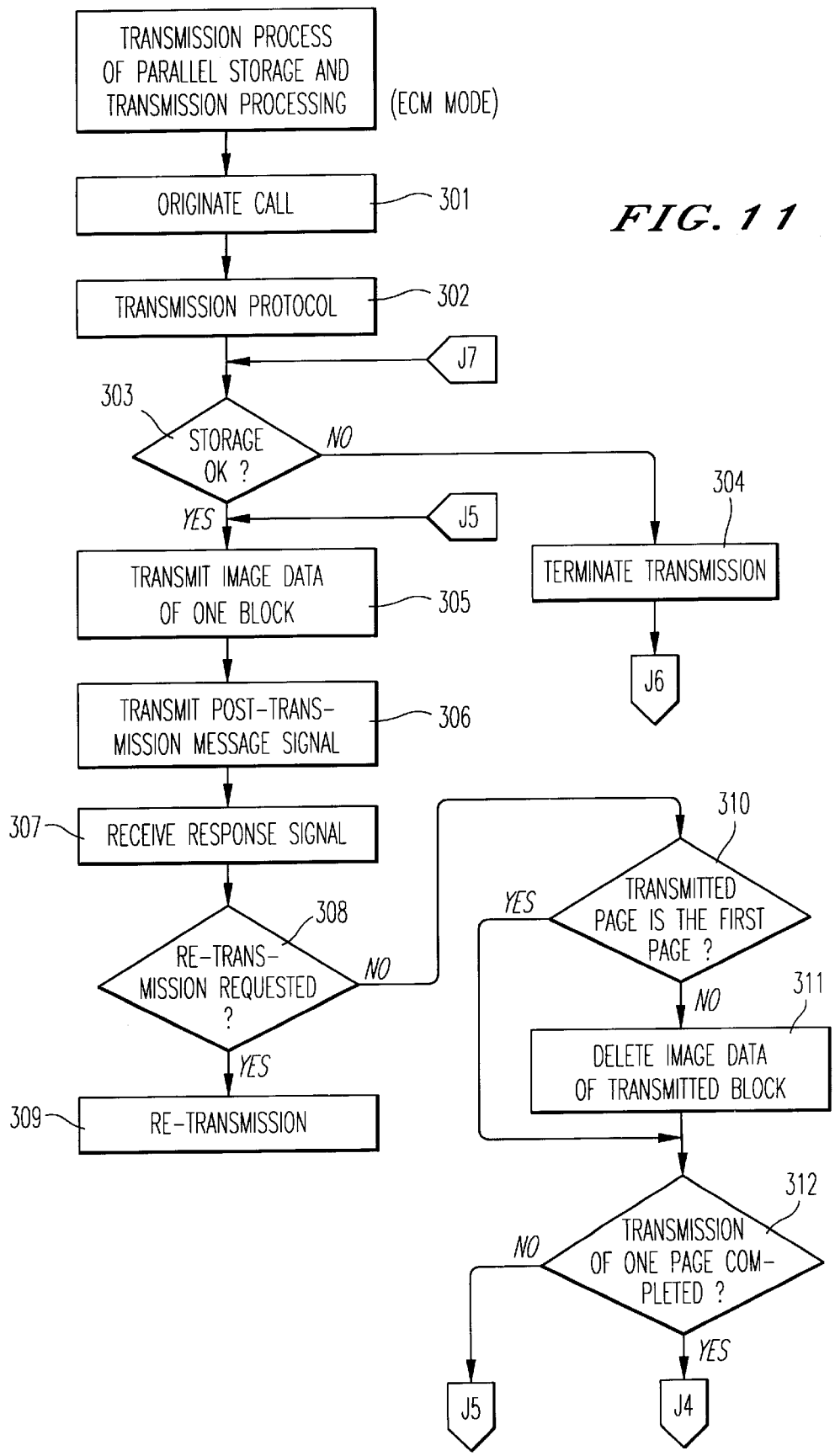
FIG. 11 and FIG. 12 are flowcharts illustrating an example of a transmission process of a parallel storage and transmission processing function in an ECM mode.
Figure 12:
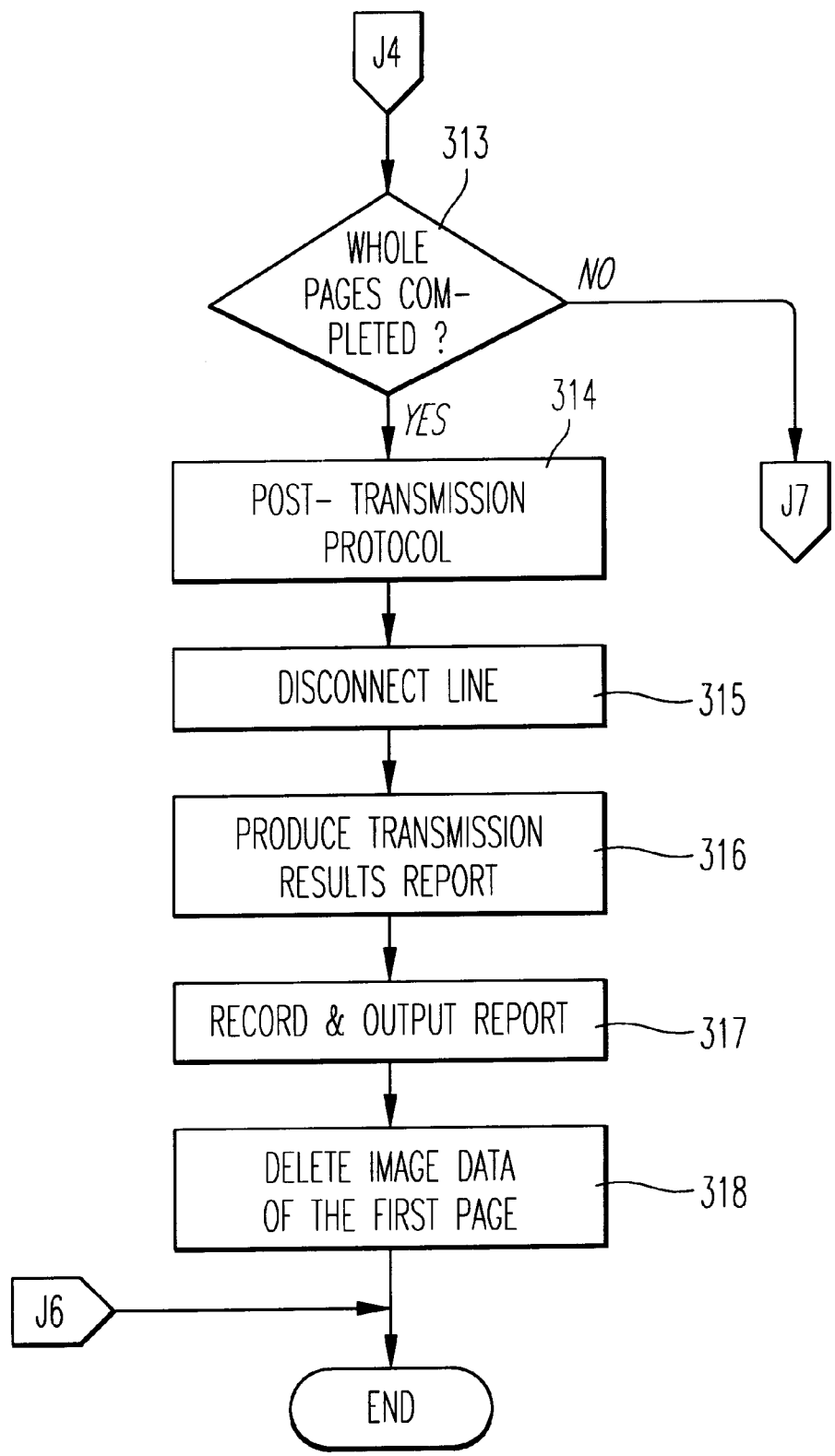

FIG. 11 and FIG. 12 are flowcharts illustrating another example of a transmission process of the parallel storage and transmission processing function. In this example, a well-known ECM mode is prescribed as a transmission mode.

First, step 301 originates a call to a designated destination and step 302 executes a prescribed transmission protocol to be made prior to transmission with the destination equipment, preparing for an image data transmission. Then, step 303 checks if a storage process is performing a storage operation normally, and if the result of step 303 is NO, step 304 discontinues a transmission operation at that timing and terminates the transmission process as an error.

When the result of step 303 is YES, step 305 selects image data for one page stored in the image storage unit 8 in order of pages and transmits image data for one block of a prescribed ECM block size, step 306 transmits a prescribed post message signal, step 307 receives a response signal from the destination equipment, and step 308 checks if retransmission of image data is requested from the destination equipment.

If the result of step 308 is YES, step 309 produces an image data of a frame which is requested to be transmitted again and transmits such image data for re-transmission, and the operation returns to step 306 and repeats the following steps.

When transmission of image data for one block is completed normally and the result of step 308 is NO, step 310 checks if the image data which has been transmitted is the first page. If the result of step 310 is NO, step 311 deletes image data for one block of the ECM block size which has been transmitted from the image storage unit 8. If the result of step 310 is YES, step 311 is not executed, leaving the image data of the first page stored in the image storage unit 8 since the image of the first page needs to be attached to a report on the transmission results. Step 312 then checks if transmission of image data for one page is completed, and if the result of step 312 is NO, the operation returns to step 305 to perform data transmission of the remaining ECM blocks.

When transmission of image data for one page is completed and the result of step 312 is YES, step 313, see FIG. 12, checks if transmission of all the pages has been completed. If the result of step 313 is NO, the operation returns to step 305 to perform transmission of image data of the next page.

When transmission of all the pages of the stored image data have been completed and the result of step 313 is NO, step 314 executes a prescribed post-transmission protocol and step 315 disconnects a line, terminating a series of transmission operations.

Then, step 316 produces an image of a report on the transmission results in accordance with the results of the transmission and attaches thereto an image of the first page as illustrated in FIG. 7, and step 317 records and outputs the report by the plotter 5. Since the image data of the first page has been made use by this process, step 318 deletes the image data of the first page from the image storage unit 8 and terminates this transmission process.

Next, how a storage area of the image storage unit 8 is used as a transmission process of the parallel storage and transmission processing function in a non-ECM mode as illustrated in FIG. 10 progresses coupled with a storage process which are illustrated in FIG. 8 and FIG. 9 is explained. FIGS. 13(a)–13(f) illustrate an example wherein a value of a storage start criterion is set to 512 KB, an original document for transmission is 7 pages, a character reading mode is prescribed with a resolution of 200×100 DPI for pages 1–5 and a photograph reading mode is prescribed with a resolution of 200×100 DPI for pages 6 and 7. Here, each drawing of FIGS. 13(a)–13(h) is graduated in 64 KB, and each size of image data of pages 1–5 is assumed to be 64 KB (which is equal to one ECM block size) and each size of image data of pages 6 and 7 is assumed to be 256 KB.

First, if an empty area of 512 KB is secured as shown in FIG. 13(a), a parallel storage and transmission processing is commenced, and image data P1–P5 of pages 1–5 are stored in consecutive order in the empty area of the image storage unit 8 as shown in FIG. 13(b).

When the image data P1–P5 of pages 1–5 are stored, the remaining storage capacity becomes 192 KB and such a value is smaller than the between pages storage start criterion value (256 KB) for image data P6 of page 6. And, therefore, reading and storage of image data P6 of page 6 is not performed.

When image data P1 and P2 of pages 1 and 2 have been transmitted by a transmission process of the parallel storage and transmission processing function, the image data P2 of page 2 is deleted and the empty area of the image storage unit 8 becomes 256 KB at that time as shown in FIG. 13(c), thus enabling reading and storage of image data P6 of page 6 as shown in FIG. 13(d). When storage of image data P6 of page 6 is completed, the remaining storage capacity of the image storage unit 8 becomes nil and reading and storage of image data P7 of page 7 is not performed.

When transmission of image data of pages 3–6 is completed in consecutive order by a transmission process of the parallel storage and transmission processing function, and the capacity of the empty storage area of the image storage unit 8 reaches 448 KB, reading and storage of image data P7 of page 7 is performed, as shown in FIG. 13(f), and transmission of the image data P7 is performed.

When a transmission process of the parallel storage and transmission processing function in an ECM mode as illustrated in FIG. 11 and FIG. 12 is performed under the same settings as described above, storage of image data P1–P6 of pages 1–6 is performed in the same manner as described above and as shown in FIGS. 13(a)–13(d).

In this case, however, since image data which has been transmitted is deleted in a unit of an ECM block, the capacity of the empty area of the image storage unit 8 becomes 256 KB as shown in FIG. 13(g) when transmission of image data for the first ECM block of image data P6 of page 6 is completed, and the image data for the same first ECM block is deleted from the image storage unit 8, and reading and storage of image data P7 of page 7 is performed at that timing as shown in FIG. 13(h).

Thus, in an ECM mode, an image data is deleted from the image storage unit 8 in a unit of an ECM block, and therefore, reading and storage of an image is performed more quickly than in a non-ECM mode.

In the above-mentioned embodiment, there is provided only one of each of a prescribed storage start criterion value and a storage start criterion value, and there exists a possibility of an image storage error occurring frequently in a case that the apparatus is used by plural users and the kind of images for transmission differ among such users. In such a case, the value of a storage start criterion becomes the one which is suitable for use by a user who frequently transmits image data with the largest data volume per page among the images transmitted by the users, and there exists a possibility that the apparatus becomes inconvenient for the other users.

Figure 4C:
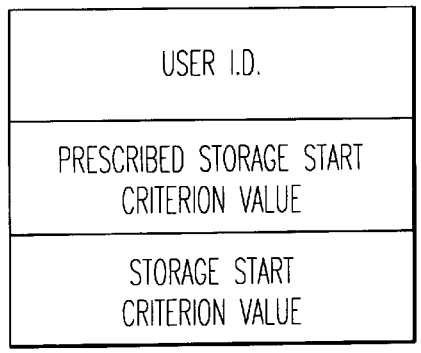
FIG. 4(c) is a diagram illustrating an example of a prescribed storage start criterion value and a storage start criterion value which are provided for each user.

In such a case, there is provided a user ID for each user or division, and a prescribed storage start criterion value and a storage start criterion value are stored for each user ID, as shown in FIG. 4(c).

Figure 14:
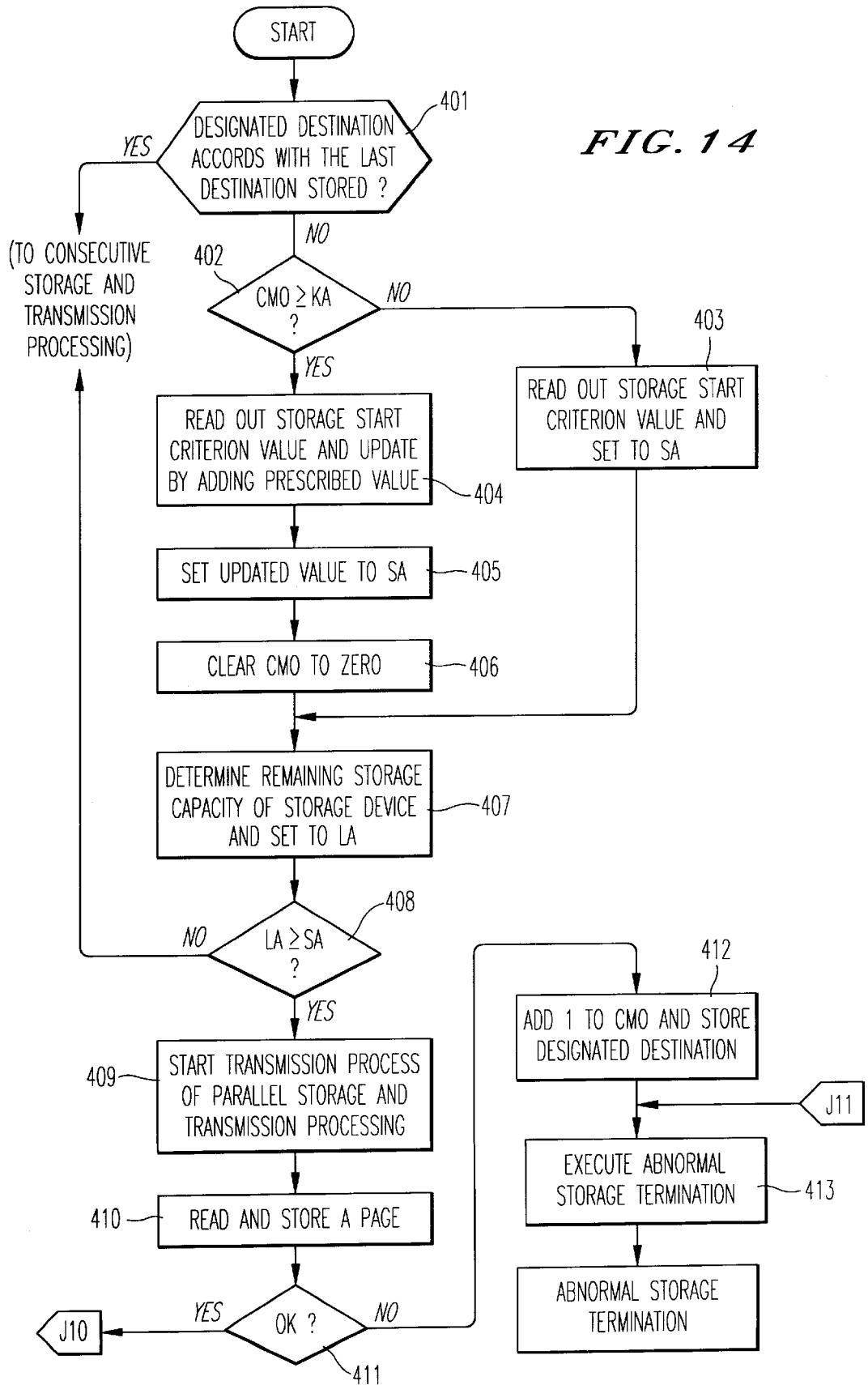
FIG. 14 and FIG. 15 are flowcharts illustrating another example of a storage process of a parallel storage and transmission processing function.
Figure 15:
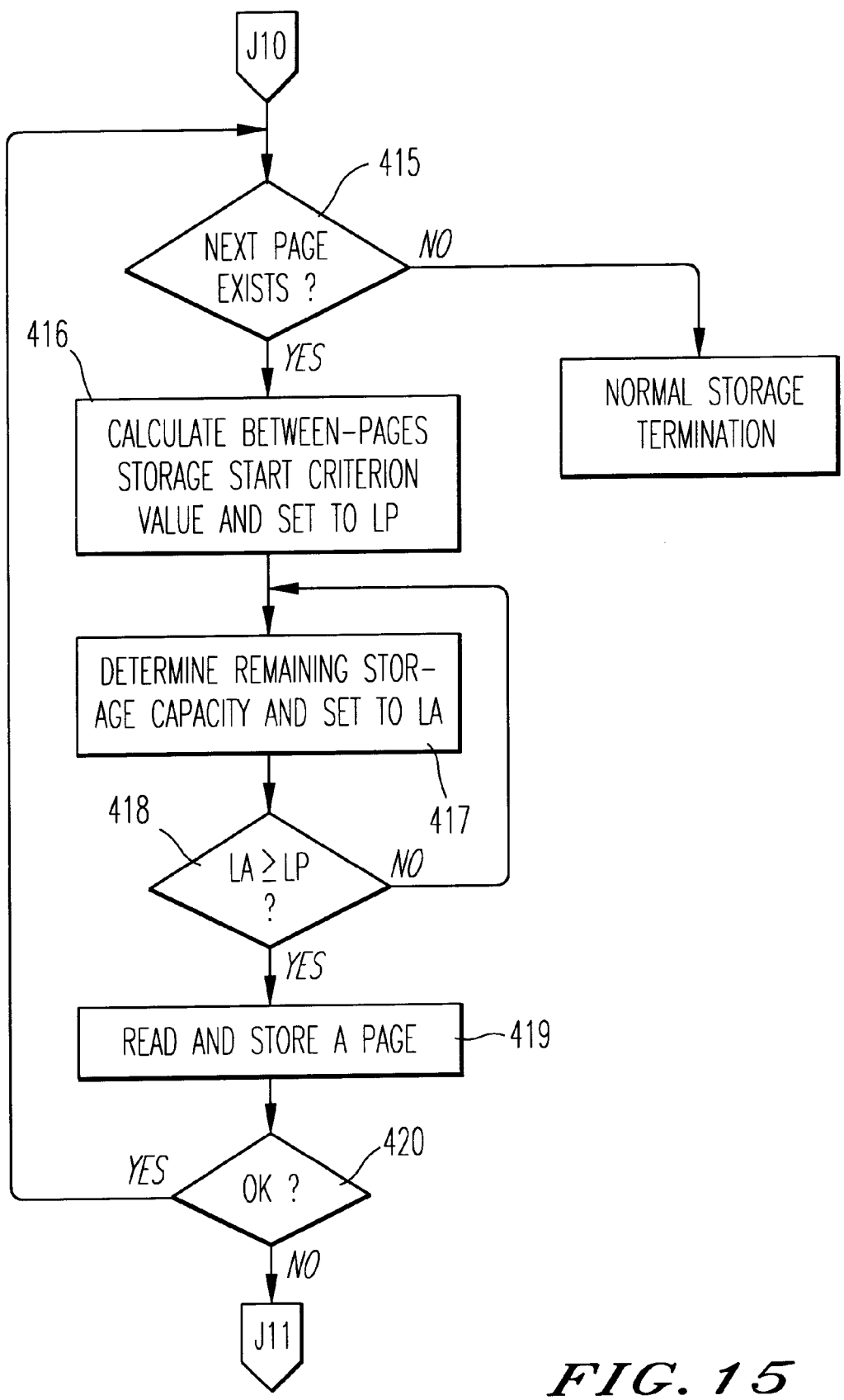

FIG. 14 and FIG. 15 illustrate an example of a storage process in such a case, and in this case a user inputs a user ID by manipulating an input device (not shown) provided on the operational display panel 6 when performing a transmission operation.

Then, step 401 checks if a designated destination accords with the one which is designated in an immediately preceding transmission and which was stored due to a storage error. If the result of step 401 is NO, step 402 checks if a value of a counter CMO, which stores the number of times of storage error, exceeds a prescribed criterion value KA. If the result of step 402 is NO, step 403 reads out from the parameter memory 3 a value of a storage start criterion value for each user which corresponds to a user ID which is inputted at that time and sets the value to a variable SA. If the result of step 402 is YES, a parallel storage and transmission processing function can not be executed with the prescribed storage start criterion value which is prescribed for each user by the user, and therefore, step 404 updates the storage start criterion value for each user which is stored in the parameter memory 3 by adding a prescribed value (for example 2 KB, 4 KB, 8 KB, 16 KB, 32 KB, 64 KB or 128 KB) to the value of a storage start criterion value for each user which is read out from the parameter memory 3. Step 405 sets such an updated value to the variable SA and step 406 clears the value of the counter CMO to zero at that time.

When a value of a storage start criterion value is set to the variable SA as described above, step 407 determines the remaining storage capacity of the image storage unit 8 and sets a value of such remaining storage capacity to a variable LA, and then step 408 checks if the value of the variable LA is larger than that of the variable SA.

When the result of step 408 is NO, it is a state that the remaining storage capacity of the image storage unit 8 is not large enough and there exists a possibility that the image storage unit 8 will overflow during transmission, thereby discontinuing an image storage operation in the middle of a page. In such a case, the above-mentioned consecutive storage and transmission processing is executed since a parallel storage and transmission processing can not be executed in an adequate manner. If a destination designated at that time accords with a destination which is designated in an immediately preceding transmission and which was stored due to a storage error and the result of step 401 is YES, it is a case that the image storage unit 8 overflows during storing image data of the first page despite conditions for starting a parallel storage and transmission processing having been met. In such a case, a parallel storage and transmission processing can not be executed, and therefore a consecutive storage and transmission processing is executed instead.

When the result of step 408 is YES, step 409 commences a transmission process of the parallel storage and transmission processing for executing an image data transmission process of the parallel storage and transmission processing, and step 410 executes a page reading and storage process to read the first page of an original document for transmission by the scanner 4, compress the resulted image signal by the encoding and decoding unit 7 and store the resulted compressed image data into the image storage unit 8. Then step 411 checks whether or not an image data for one page of an image for transmission has been stored in an adequate manner in the image storage unit 8 by such a page reading and storage process.

In a case the result of step 411 is NO, step 412 adds 1 to a value of the counter CMO and at the same time stores a destination designated at that time as a destination transmission which has been discontinued during transmission due to a storage error, and step 413 terminates the image data storage by executing an abnormal storage termination process which is a prescribed processing for a case that image data storage is terminated abnormally. This abnormal storage termination process is a process to display a guidance message for notifying a user who is waiting beside the apparatus of a completion of an abnormal termination process, sound an error beep, interrupt reading of an original document by the scanner 4 and exit an original document from the scanner 4 whose reading has been discontinued while reading.

When the result of step 411 is YES, see FIG. 15, step 415 checks if the next page of an original document for transmission is placed on the scanner 4, and if the result of step 415 is NO, it is the case that all the pages of an original document have been read and the storage process is terminated normally.

When the result of step 415 is YES, step 416 reads out from a coefficient table a coefficient which is applicable to a resolution and a reading mode which are designated at that time, calculates a between-pages storage start criterion value by multiplying a value of such a coefficient to a value of a prescribed between-pages storage start criterion value, and sets such a between-pages storage start criterion value to the variable LP.

Then, step 417 determines the remaining storage capacity of the image storage unit 8 and sets the resultant value to the variable LA. Step 418 then checks if the value of the variable LA is larger than the value of the variable LP and if the result of step 418 is NO, image data which has been transmitted in a transmission process of the parallel storage and transmission processing function is deleted from the image storage unit 8. Step 417 and step 418 are repeated until the capacity of the empty storage area of the image storage unit 8 is secured and the value of the variable LA becomes larger than the value of the variable LP.

When the result of step 418 is YES, step 419 executes a page reading and storage process to read the next page of an original document for transmission by the scanner 4, compress the resultant image signal by the encoding and decoding unit 7 and store the resultant compressed image data in the image storage unit 8. Then, step 420 checks if an image data for one page of an image for transmission is stored adequately in the image storage unit 8 by such a page reading and storage process.

If the result of step 420 is YES, the process returns to step 415 which checks if there is a next page. If the result of step 420 is NO, the operation returns to step 413 to execute an abnormal storage termination process, thereby terminating the transmission operation by the transmission process of the parallel storage and transmission processing function.

In the above-mentioned embodiment, the storage start criterion value is made to be updated based upon the number of times of abnormal storage termination. However, the storage start criterion value may be made to be updated based upon the frequency of an abnormal storage termination, such as the number of times of an abnormal storage termination per week or month.

Further, although the above-mentioned embodiments have been described and explained in a case that the present invention is adapted to a G3 facsimile equipment, the present invention may be adapted likewise to other image communication apparatus also.

As described above, with the image communication apparatus in accordance with the present invention, a parallel storage and transmission processing is not executed when the remaining storage capacity of an image storage device is not large enough. Therefore, in the present invention there does not occur such an inconvenient situation that an image storage device overflows to disable further storage of an image data during storing an image data of an original document for transmission, and a parallel storage and transmission processing is executed in an adequate manner accordingly.

Also, when an overflow of an image storage device happens frequently while a parallel storage and transmission processing is being executed, a criterion value for the remaining storage capacity of the image storage device is updated accordingly, and therefore, a parallel storage and transmission processing is executed in an adequate manner with the image communication apparatus in accordance with the present invention.

Also, when transmission is instructed to a destination which accords with the last destination which is designated in an immediately preceding transmission operation and transmission to which has been discontinued due to an overflow of an image storage device immediately after a parallel storage and transmission processing has been commenced, a parallel storage and transmission processing is not executed and another mode of image data communication is executed instead accordingly. Therefore, efficient image data communication is possible with the image communication apparatus in accordance with the present invention.

Also, since an image data of an image of a first page of an original document for transmission which is attached to a report showing the transmission results is kept in an image storage device, an adequate report showing the transmission results can be recorded and outputted with the image communication apparatus in accordance with the present invention.

Also, since an image data for a block of an ECM mode which has been transmitted is deleted from an image storage device every time when the transmission is completed, a storage process for the following pages is executed smoothly and a transmission time is shortened with the image communication apparatus in accordance with the present invention.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An image communication apparatus having a parallel storage and transmission processing function to execute an image storage process for storing image data for transmission into an image storage device, after compression, in parallel with an image transmission process for transmitting the image data stored in the image storage device for transmission and having a consecutive storage and transmission function to execute an image storage process and then to execute an image transmission process after the image storage process, comprising:
   a memory device for storing a criterion value for a remaining storage capacity of the image storage device, wherein said criterion value is changeable; and
   control means for determining if the remaining storage capacity of the image storage device is larger than the criterion value stored in the memory device prior to executing said parallel storage and transmission processing function, and executing image data communication with said parallel storage and transmission processing function when the remaining storage capacity of the image storage device is determined as larger than said criterion value stored in the memory device and with said consecutive storage and transmission function when the remaining storage capacity is determined as smaller than said criterion value stored in the memory device, and said control means changing said criterion value based on deleting occurrences of an overflow of the image storage device.

2. The image communication apparatus according to claim 1, wherein said control means, when the image storage device overflows immediately after image data communication with the parallel storage and transmission processing is commenced, stores information on a destination which is designated as a last destination transmission to which transmission has been discontinued due to an overflow of the image storage device, while executing image data communication with said consecutive storage and transmission function when the designated destination accords with said last destination which is stored.

3. The image communication apparatus according to claim 1, wherein said control means, detecting an overflow of the image storage device while image data communication with said parallel storage and transmission processing is being executed, counts a number of times of detecting an overflow of the image storage device and changes said criterion value for the remaining storage capacity of the image storage device when the counted number exceeds a prescribed value.

4. The image communication apparatus according to claim 1, wherein said control means, detecting an overflow of the image storage device while image data communication with said parallel storage and transmission processing function is being executed, determines a frequency of detecting an overflow of the image storage device and changes said criterion value for the remaining storage capacity of the image storage device when the frequency exceeds a prescribed value.

5. An image communication apparatus having a parallel storage and transmission processing function to execute an image storage process for storing image data for transmission into an image storage device, after compression, in parallel with an image transmission process for transmitting the image data stored in the image storage device for transmission and having a consecutive storage and transmission function to execute an image storage process and then to execute an image transmission process after the image storage process and a function to record and print out, when transmission is completed, a report showing the transmission results and attaching thereto an image of a first page of an image for transmission, comprising:
   a memory device for storing a criterion value for a remaining storage capacity of the image storage device, wherein said criterion value is changeable; and
   control means for determining if the remaining storage capacity of the image storage device is larger than the criterion value stored in the memory device prior to executing said parallel storage and transmission processing, executing image data communication with said parallel storage and transmitting processing function when the remaining storage capacity of the image storage device is determined as larger than said criterion value stored in the memory device and with said consecutive storage and transmission function when the remaining storage capacity is determined as smaller than said criterion value stored in the memory device, and, when transmission of image data for a page is completed while image data communication with said parallel storage and transmission processing function is being executed, deleting image data which has been transmitted from the image storage device if the image data is not of the first page of an image for transmission, and said control means changing said criterion value based on detecting occurrences of an overflow of the image storage device.

6. An image communication apparatus having a parallel storage and transmission processing function to execute an image storage process for storing image data for transmission into an image storage device, after compression, in parallel with an image transmission process for transmitting the image data stored in the image storage device for transmission and having a consecutive storage and transmission function to execute an image storage process and then to execute an image transmission process after the image storage process and a function to record and print out, when transmission is completed, a report showing transmission results and attaching thereto an image of a first page of an image for transmission, comprising:
   a memory device for storing a criterion value for a remaining storage capacity of the image storage device, wherein said criterion value is changeable; and
   control means for determining if the remaining storage capacity of the image storage device is larger than the criterion value stored in the memory device prior to executing said parallel storage and transmission processing function, executing image data communication with said parallel storage and transmission processing when the remaining storage capacity of the image storage device is determined as larger than the criterion value stored in the memory device and with said consecutive storage and transmission function when the remaining storage capacity is determined as smaller than said criterion value stored in the memory device, and, when transmission of image data for a block of an error correction mode is completed while image data communication with said parallel storage and transmission processing is being executed, deleting image data of a block which has been transmitted from the image storage device if the block is not of the first page of an image for transmission, and said control means changing said criterion value based on detecting occurrences of an overflow of the image storage device.

7. An image communication apparatus having a parallel storage and transmission processing function to execute an image storage process for storing image data for transmission into an image storage device, after compression, in parallel with an image transmission process for transmitting the image data stored in the image storage device for transmission and having a consecutive storage and transmission function to execute an image storage process and then to execute an image transmission process after the image storage process, comprising:

a memory device for storing first and second criterion values for a remaining storage capacity of the image storage device, wherein at least one of said first and second criterion values is changeable; and control means for determining if the remaining storage capacity of the image storage device is larger than the first criterion value stored in the memory device prior to executing said parallel storage and transmission processing function, executing image data communication with said parallel storage and transmission processing function when the remaining storage capacity of the image storage device is determined as larger than the first criterion value stored in the memory device and with said consecutive storage and transmission function when the remaining storage capacity is determined as smaller than said first criterion value stored in the memory device, and, when transmission of image data for a page is completed while image data communication with said parallel storage and transmission processing function is being executed, storing image data of following pages only when the remaining storage capacity of the image storage device is larger than the second criterion value stored in the memory device, and said control means changing said at least one of said first and second criterion values based on detecting occurrences of an overflow of the image storage device.

8. The image communication apparatus according to claim 7, wherein said control means, when transmission of image data for a page is completed while image data communication with said parallel storage and transmission processing function is being executed, deletes from the image storage device image data of a page which has been transmitted.

9. The image communication apparatus according to claim 8, wherein said control means, detecting an overflow of the image storage device while image data communication with said parallel storage and transmission processing function is being executed, counts a number of times of detecting an overflow and changes the first criterion value stored in the memory device when the counted number exceeds a prescribed value.

10. An image communication apparatus having a parallel storage and transmission processing function to execute an image storage process for storing image data for transmission into an image storage device, after compression, in parallel with an image transmission process for transmitting the image data stored in the image storage device for transmission and having a consecutive storage and transmission function to execute an image storage process and then to execute an image transmission process after the image storage process and a function to record and print out, when transmission is completed, a report showing transmission results and attaching thereto an image of a first page of an image for transmission, comprising:

a memory device for storing first and second criterion values for a remaining storage capacity of the image storage device, wherein at least one of said first and second criterion values is changeable; and control means for determining if the remaining storage capacity of the image storage device is larger than said first criterion value stored in the memory device prior to executing said parallel storage and transmission processing function, executing image data communication with said parallel storage and transmission processing function when the remaining storage capacity of the image storage device is determined as larger than the first criterion value stored in the memory device and with said consecutive storage and transmission function when the remaining storage capacity is determined as smaller than said first criterion value stored in the memory device, and, when transmission of image data for a page is completed, while image data communication with said parallel storage and transmission processing function is being executed, deleting image data for a page which has been transmitted from the image storage device if the image data is not of the first page of an image for transmission, and further, storing image data of following pages only when the remaining storage capacity of the image storage device is larger than the second criterion value stored in the memory device, and said control means changing said at least one of said first and second criterion values based on detecting occurrences of overflow of the image storage device.

11. An image communication apparatus having a parallel storage and transmission processing function to execute an image storage process for storing image data for transmission into an image storage device, after compression, in parallel with an image transmission process for transmitting image data stored in the image storage device for transmission and having a consecutive storage and transmission function to execute an image storage process and then to execute an image transmission process after the image storage process and a function to record and print out, when transmission is completed, a report showing transmission results and attaching thereto an image of a first page of an image for transmission, comprising:

a memory device for storing first and second criterion values for a remaining storage capacity of the image storage device, wherein at least one of said first and second criterion values is changeable; and control means for determining if the remaining storage capacity of the image storage device is larger than the first criterion value stored in the memory device prior to executing said parallel storage and transmission processing function, executing image data communication with said parallel storage and transmission processing function when the remaining storage capacity of the image storage device is determined as larger than the first criterion value stored in the memory device and with said consecutive storage and transmission function when the remaining storage capacity is determined as smaller than said first criterion value stored in the memory device, and, when transmission of image data for a block of an error correction mode is completed, while image data communication with said parallel storage and transmission processing function is being executed, deleting image data of a block which has been transmitted from the image storage device if the block is not of the first page of an image for transmission, and further, when transmission of image data for a page is completed, storing image data of following pages only when the remaining storage capacity of the image storing device is larger than the second criterion value stored in the memory device, while deleting image data of a page which has been transmitted from the image storage device, and said control means changing said at least one of said first and second criterion values based on detecting occurrences of overflow of the image storage device.

12. An image communication apparatus comprising:

an image storage device for storing image data for transmission;

an image transmission device for transmitting the image data stored in the image storage device for transmission in parallel with storing the image data in the image storage device in a parallel storage and transmission mode and having a consecutive storage and transmission mode to execute an image storage process and then to execute an image transmission process after the image storage process;

a memory device for storing a criterion value for a remaining storage capacity of the image storage device, wherein said criterion value is changeable; and control means for determining if the remaining storage capacity of the image storage device is larger than the criterion value stored in the memory device prior to executing said parallel storage and transmission processing mode, and executing image data communication with said parallel storage and transmission mode when the remaining storage capacity of the image storage device is determined as larger than said criterion value stored in the memory device and with said consecutive storage and transmission mode when the remaining storage capacity is determined as smaller than said criterion value stored in the memory device, and said control means changing said criterion value based on detecting occurrences of overflow of the image storage device.

13. The image communication apparatus according to claim 12, wherein said control means, when the image storage device overflows immediately after image data communication with the parallel storage and transmission processing is commenced, stores information on a destination which is designated as a last destination transmission to which transmission has been discontinued due to an overflow of the image storage device, while executing image data communication with said consecutive storage and transmission mode when the designated destination accords with said last destination which is stored.

14. The image communication apparatus according to claim 12, wherein said control means, detecting an overflow of the image storage device while image data communication with said parallel storage and transmission processing is being executed, counts a number of times of detecting an overflow of the image storage device and changes said criterion value for the remaining storage capacity of the image storage device when the counted number exceeds a prescribed value.

15. The image communication apparatus according to claim 12, wherein said control means, detecting an overflow of the image storage device while image data communication with said parallel storage and transmission processing function is being executed, determines a frequency of detecting an overflow of the image storage device and changes said criterion value for the remaining storage capacity of the image storage device when the frequency exceeds a prescribed value.

16. The image communication apparatus according to claim 12, further comprising:

means to record and print out, when transmission is completed, a report showing transmission results and attaching thereto an image of a first page of an image for transmission.

17. The image communication apparatus according to claim 16, wherein the controller further deletes image data which has been transmitted from the image storage device if the image data is not of the first page of the image for transmission.

18. The image communication apparatus according to claim 12, wherein the storage means further stores a second criterion value of a storage capacity of the image storage device, and wherein the controller further stores, when transmission of image data for a page is completed while image data communication with said parallel storage and transmission processing function is being executed, image data of following pages only when the remaining storage capacity of the image storage device is larger than the second criterion value stored in the memory device.

19. The image communication apparatus according to claim 18, wherein the controller further deletes image data which has been transmitted from the image storage device if the image data is not of the first page of the image for transmission.

* * * * *